United States Patent
Hahn et al.

(10) Patent No.: US 6,255,379 B1
(45) Date of Patent: Jul. 3, 2001

(54) RUBBER CONTAINING SHORT FIBER REINFORCEMENT WITH ANCHORING AGENT AND ARTICLES, INCLUDING TIRES, HAVING A COMPONENT THEREOF

(75) Inventors: Bruce Raymond Hahn, Hudson; Thierry Florent Edme Materne, Fairlawn, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/397,751

(22) Filed: Sep. 16, 1999

(51) Int. Cl.⁷ ...................................................... C08K 3/00
(52) U.S. Cl. ............................................ 524/492; 524/495
(58) Field of Search ...................................... 524/492, 495

(56) References Cited

U.S. PATENT DOCUMENTS 5,852,097 * 12/1998 Kikuchi ................................. 524/492
5,929,157 * 7/1999 Matsuo .................................. 524/496
5,967,211 * 10/1999 Lucas et al. ....................... 152/209.4

FOREIGN PATENT DOCUMENTS

| 0265070 | 4/1988 | (EP) | ............................... C08L/21/00 |
| 0904958 | 3/1999 | (EP) | ............................... B60C/9/18 |
| 1048691 | 11/2000 | (EP) | ............................... C08L/21/00 |

* cited by examiner

*Primary Examiner*—Edward J. Cain
(74) *Attorney, Agent, or Firm*—Henry C Young, Jr.

(57) ABSTRACT

The invention relates to composites of rubber compositions reinforced with short, discontinuous fibers together with an anchoring agent. Preferably, the rubber composition is exclusive of amorphous silica. The invention also relates to articles, including industrial products and tires, which have at least one component thereof. The invention particularly relates to industrial rubber belts having at least one component of such rubber composite and to tires with at least one component of such rubber composite.

101 Claims, No Drawings

RUBBER CONTAINING SHORT FIBER REINFORCEMENT WITH ANCHORING AGENT AND ARTICLES, INCLUDING TIRES, HAVING A COMPONENT THEREOF

FIELD

The invention relates to composites of rubber compositions reinforced with short, discontinuous fibers together with an anchoring agent. Preferably, the rubber composition is exclusive of amorphous silica. The invention also relates to articles, including industrial products and tires which have at least one component thereof. The invention particularly relates to industrial rubber belts having at least one component of such rubber composite and to tires having at least one component of such rubber composite.

BACKGROUND

It is sometimes desired to reinforce various rubber compositions with short, discontinuous fibers for various purposes. For example, see U.S. Pat. No. 4,871,004.

Use of only a very minor amount (e.g. from 4 to 8 phr) of short fibers in a rubber composition formulation typically substantially increases the viscosity (e.g. Mooney viscosity) of the uncured rubber composition to an extent which may make the rubber composition more difficult to mix in an internal rubber mixer and otherwise process. It is believed that such phenomenon is well known to those having skill in such art.

Where it is desired to provide a durable cured rubber composition as a component in various articles such as, for example, a component of an industrial belt or as an insert in a tire sidewall to stiffen the sidewall, it might seem logical to contemplate the use short fibers as reinforcement for such rubber composition.

Silica rich rubber compositions conventionally shrink somewhat upon sulfur vulcanization. It has been previously suggested, in the case of silica reinforced tire treads which contain at least 30 phr of silica which is accompanied by a silica coupling agent (see U.S. Pat. No. 5,852,097), to add about 2 to about 10 phr of short fibers to alleviate, or at least reduce such shrinkage. Apparently, the chemical reaction between the silica coupling agent and silica is necessarily expected to continue in order that the silica in the silica rich rubber composition fulfills its use as a reinforcing filler which is coupled to the elastomer(s) of the tire tread rubber composition.

Significantly, while it has been observed herein that addition of small amounts of short fiber reinforcement in a silica-free, carbon black reinforced rubber composition does increase its uncured viscosity so that processing of the uncured rubber has to be taken into consideration, one or more physical properties of the cured rubber composition may be degraded.

For example, it has heretofore been observed that although a 300 percent modulus of such a carbon black reinforced cured rubber composition may increase upon addition of a short fiber, the ultimate tensile strength of the cured rubber composition has been reduced. The reduction in tensile strength of a rubber composition may be a serious matter where such cured rubber composition is relied for its durability during service conditions for the rubber composition.

While such phenomenon may not be fully understood, it is believed that it is due, at least in part, to a very small degree of relative mobility of the short fibers within the cured rubber composition as compared to particulate carbon black reinforcement during service conditions during which the rubber composition may be subject to extensive dynamic flexing even though such flexing may only involve relative short extensions, or deformations, of the rubber composition itself.

Accordingly, it has been contemplated herein to add an anchoring agent to a substantially silica-free, carbon black reinforced rubber composition to provide some degree of anchoring at least a portion of short fibers contained in a rubber composition and thereby prevent, or at least retard, their small relative movement within the rubber composition during service conditions.

While various anchoring agents may be considered, use of coupling agents sometime used for coupling amorphous silica to various diene-based rubber compositions are considered herein. While such silica coupling agents typically chemically react with the surface of the silica to couple the silica to an elastomer by having a moiety which is chemically reactive with hydroxyl groups on the surface of the silica (e.g. silanol groups) and another moiety which is interactive with a diene-based elastomer of the rubber composition itself.

In the description of this invention, the term "phr" means parts by weight of a specified ingredient per 100 parts by weight of elastomer.

Also, in the description of this invention, the terms "rubber" and "elastomer" are used interchangeably, unless otherwise noted.

The terms "vulcanized" and "cured" are also used interchangeably unless otherwise noted.

SUMMARY AND PRACTICE OF THE INVENTION

In accordance with this invention, a rubber composition, substantially exclusive of silica, particularly amorphous silica, preferably less than 12 phr and more preferably exclusive of such silica, and is comprised of, based upon 100 phr of elastomer, (A) 100 phr of at least one diene-based elastomer selected from homopolymers and copolymers of conjugated diene and copolymers of at least one conjugated diene with a vinyl aromatic compound selected from styrene and alpha-methylstyrene, preferably styrene, (B) about 0.5 to about 10, preferably about 0.5 to about 4, phr of short, discrete organic fibers, (B) from about 35 to about 85 phr of reinforcing carbon black and (C) an anchoring agent for said fibers having a moiety reactive with at least one of hydroxyl groups and alkoxy groups and another moiety interactive with at least one of said diene-based elastomers.

In further accordance with this invention, such rubber composition is sulfur vulcanized. Such sulfur vulcanization is conventionally vulcanizing said rubber composition in a suitable mold to a temperature in a range of about 140° C. to about 190° C. for a sufficient period of time for the rubber composition to vulcanize, usually from about 12 to about 25 minutes.

In practice, such anchoring agent may, for example and not intended to be limiting, be comprised of the general formula (I) or (II):

wherein R is an alkyl group selected from at least one of methyl and ethyl groups, R' is an alkyl group selected from ethyl, propyl and butyl groups and n is a value of from 2 to 6 with an average of from 2 to 2.6 or from 3.5 to 4, and X is a radical selected from at least one of mercapto, methacrylate and epoxide, vinyl, amino, thiocyanato, ureido, isocyanato radicals.

Representative examples of an anchoring agent of formula (I) are, for example bis-(3-trialkoxysilyl) tetrasulfide with an average of from about 2 to 2.5 or 3.5 to 4 connecting sulfur atoms in its polysulfidic bridge.

For example, such anchoring agent may be a bis-(3-triethoxysilyl) polysulfide.

Representative examples of an anchoring agent of formula (II) are, for example, 3-mercapto propyl triethoxysilane, 2-mercapto ethyl triethoxysilane and 4-mercapto butyl triethoxysilane; and (3-glycidoxypropyl) triethoxysilane.

While various of such anchoring agents might have also been proposed for use as silica coupling agents for silica rich rubber compositions, including for example tire treads of such rubber compositions, it has been preferred to refer to such materials as "anchoring agents" herein because, as hereinbefore discussed, first, the rubber composition of this invention is not intended to be a silica rich rubber composition and secondly, the mechanism of the interaction of the anchoring agent, in the absence of the silica, is not entirely clear insofar as its anchoring effect may be based upon a creation of a stabilizing siloxane compound by an in-situ chemical interaction with itself which may or may not involve a significant physical and/or chemical in-situ interaction with the short fibers itself.

It has been observed herein that a particular significance of providing a rubber composition which contains a short fiber reinforcement in combination with an anchoring agent can be an improvement of the cured rubber composition's 100 percent modulus while substantially maintaining its ultimate tensile strength.

This is believed to be a departure from past practice where introduction of short fiber reinforcement into a rubber composition has heretofore been observed increase its modulus while significantly degrading its tensile strength.

This is considered herein to be significant in order that a composite of a rubber composition which contains short fiber reinforcement might be prepared where it is desired to have significant tensile strength.

In accordance with invention, various articles of manufacture may be prepared which have a component of such fiber reinforced rubber composition such as, for example, industrial rubber products and tires.

Exemplary of industrial rubber products are, for example, hoses and belts such as, for example, power transmission belts and conveyor belts.

In a further aspect of this invention, said rubber composition is provided as a component for use in a tire which may, for example, be selected from at least one of a tire apex and/or sidewall insert for stiffening a tire sidewall, preferably a tire sidewall apex.

Accordingly, in additional accordance with this invention, said tire sidewall insert is an apex designed to be positioned adjacent to a bead portion of a pneumatic tire.

In further accordance with this invention, said tire sidewall insert is an insert to be positioned within the tire sidewall portion and spaced apart from the bead portion of a pneumatic tire in order to add stiffness to the sidewall itself.

In further practice of this invention, a tire is provided which is comprised of an assembly of at least a component as a partially pre-vulcanized rubber composition of this invention juxtapositioned to at least one additional, unvulcanized, diene-based, rubber composition; wherein said assembly is sulfur vulcanized in a suitable mold at a temperature in a range of about 140° C. to about 190° C.

In practice, various organic short fibers may be used.

For example, natural cellulosic fibers may be used such as, for example, cotton and rayon, as well as various synthetic fibers such as, for example, polyester, polyamide and polyaramid fibers.

It is contemplated herein that the short fibers may also be in a form of fibrillated fibers, namely fibers which contain a substantial plurality of fibrils extending from a main fiber trunk which have diameters substantially smaller than the main fiber trunk from which they extend.

For example, various synthetic aramid fibers may be in a form of fibrillated fibers, although fibrillated fibers are not intended herein to be limited to aramid fibers.

The short fibers may have an average diameter, for example, in a range of about 0.05 to about 0.8 microns and an average length, for example, in a range of about 20 to about 800 microns with an average aspect ratio (ratio of length to diameter of the fiber) in a range of about 25 to about 16,000.

It is to be appreciated that, while the above individual aspects and/or ingredients are not necessarily by themselves individually new or novel, it is considered herein that a significant aspect of this invention is an innovative and novel creation of the combination of the multiplicity of ingredients and a manipulation thereof for the preparation of an article of manufacture where a component of dimensional stability, or durability is desired—particularly for components of industrial belts and of tires—and particularly for preparation of a tire sidewall component such as a relatively stiff sidewall insert or a sidewall apex is desired or a short fiber reinforced industrial belt such as a conveyor belt or power transmission belt.

For the practice of this invention, various diene-based elastomers may be used.

Representative of various diene-based elastomers are, for example, homopolymers and copolymers of conjugated dienes such as, for example, isoprene and 1,3-butadiene as well as copolymers of conjugated dienes such as, for example, isoprene and 1,3-butadiene, with vinyl aromatic compounds such as styrene and alpha-methylstyrene, preferably styrene.

Preferably, the said conjugated diene is selected from at least one of isoprene and 1,3-butadiene.

Accordingly, representative of such elastomers may be, for example, cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

End functionalized solvent solution polymerization prepared elastomers are also contemplated with such end functionalization selected from at least one of alkoxy, silyl and epoxy groups. Representative of such elastomers are end functionalized isoprene/butadiene copolymers, styrene/butadiene copolymers and styrene/isoprene/butadiene terpolymers.

Tin coupled organic solvent solution polymerization prepared elastomers are also contemplated such as, for example, solution polymerization prepared cis 1,4-polyisoprene, cis 1,4-polybutadiene and styrene/butadiene copolymers.

Representative of various anchoring agents for use with the aforesaid short fibers according to this invention may be coupling agents such as, for example, bis-(trialkoxysilylalkyl) polysulfides containing in a range of about 2 to about 8 sulfur atoms in its polysulfidic bridge, with an average of from about 3.5 to about 4.5 sulfur atoms for a polysulfide material or an average of from about 2 to 2.6 sulfur atoms for a disulfide type of material.

Further representative of such anchoring agent is, for example, bis-(3-triethoxysilylpropyl) polysulfide having an average of from 3.5 to 4.5, or an average of from 2 to 2.6, sulfur atoms in its polysulfidic bridge.

While it is a preferred characterization of the anchoring agent that it has a moiety which is reactive with hydroxyl groups and another moiety which may be interactive with diene-based elastomers, it is preferred that the moiety which is reactive with hydroxyl groups is a silane-based moiety.

While the mechanism by which a short fiber is, at least in part, anchored within its elastomer host, it is envisioned that the anchoring agent, particularly where it has a moiety which is silane based, creates in-situ within the elastomer host a matrix which inhibits, or at least retards, movement of the short fiber within the cured elastomer composition during service conditions which involves a substantial repetition of flexing conditions.

It is not clear in the practice of this invention whether short fibers would be anchored within a rubber composition by such coupling of the fiber to the elastomer or whether their small relative movement might be inhibited by a protective siloxane formation by an in-situ chemical interaction between elements of the coupling agent itself, thereby, interlocking at least a portion of the short fibers within the rubber composition. Perhaps a degree of both phenomena may occur.

In order that the anchoring, or coupling, agent is chemically focused upon an anchoring phenomenon relating to the short fibers, it is desired that the rubber composition itself is exclusive, or at least substantially exclusive, of silica and particularly amorphous silica which, primarily because hydroxyl groups (e.g. silanol groups) conventionally on the surface of amorphous silica are available to compete with the short fibers for the aforesaid moiety of the anchoring agent which is reactive with hydroxyl groups, as well as potentially with a chemical reaction of the anchoring agent with itself to form a semi-network thereof.

Where the short fiber may have hydroxyl groups on its surface or in a coating on the surface of the short fiber, it is contemplated that such hydroxyl group may react with a moiety contained in the anchoring agent which is reactive with hydroxyl groups and to, thereby, contribute to the anchoring or the short fiber within its elastomer host.

As previously discussed, a weight ratio of anchoring agent to the short fibers in a range of about 0.01/1 to about 0.25/1 is contemplated.

Accordingly, since only about 2 to about 10, or less, phr of short fibers is used for reinforcement of the rubber composition, in combination with reinforcing carbon black, it is readily seen that only a minimal amount of the anchoring agent is used, thus, conserving a relatively costly ingredient for the rubber composition and, also, resulting in only a minimal release of ethanol within the rubber composition and associated atmosphere as the anchoring agent itself forms a stabilizing composite within the elastomer host and/or reacts with hydroxyl and/or amide groups contained on the surface of the short fibers, including any such groups which may be contained in a coating on the surface of the short fibers.

The curatives for sulfur curing the rubber compositions used in this invention are curatives conventionally used for sulfur-curable elastomers which typically include sulfur, e.g.: addition of free sulfur, and one or more appropriate cure accelerators and sometimes also a cure retarder. Such curatives and use thereof for sulfur-curable elastomer compositions are well known to those skilled in the art.

Sequential mixing processes for preparing sulfur-curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

It is readily understood by those having skill in the art that the rubber composition would be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linolenic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide may comprise about 2 to about 10 phr. Typical amounts of waxes comprise about 1 to about 5 phr. Often microcrystalline waxes are used. Typical amounts of peptizers, if used, may comprise about 0.05 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. A relatively high level of elemental sulfur-vulcanizing agent is preferably used in an amount ranging from about 3 to about 8 phr which may be preferred in order that the partially pre-vulcanized rubber composition possesses a relatively high level of unused free sulfur at or on its surface which is available to participate in crosslinking of rubber-based components at their interfaces.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of various additives, as hereinbefore described, are not considered to be an aspect of the present invention, unless otherwise designated herein, which is more primarily directed to the preparation of products by providing a rubber composition with short fiber reinforcement together with a anchoring agent.

The following example is provided to further illustrate the invention. The parts and percentages are by weight unless otherwise indicated.

EXAMPLE I

Various short fiber reinforced rubber compositions are prepared by which a portion of the Samples individually contained short fibers of cotton flock and of aramid pulp in a rubber composition of natural cis 1,4-polyisoprene, synthetic cis 1,4-polyisoprene and cis 1,4-polybutadiene elastomers and identified herein as Samples A-I. The Samples did not contain silica reinforcement.

In particular, Samples A and D was a Control Sample without such short fibers or anchoring agent.

Sample D was, in a sense, a "Control" for comparison purposes since it did contain an anchoring agent but did not contain the short fibers.

Sample E was, in a sense, also a Control, being the same as Control Sample A except that increased level of accelerator was used.

In particular, Samples B–C contained 3 phr of cotton flock and F–G contained 10 phr of cotton flock of which Samples B and F also contained an anchoring agent.

In particular, Samples H and I contained the aramid pulp short fibers in which Sample H also contained an anchoring agent; whereas Sample I did not.

The short fibers are incorporated into the rubber composition by mixing the fibers with the rubber compounding ingredients in an internal mixer to a temperature of about 170° C. for about 3 minutes without sulfur curative and vulcanization accelerators.

The resulting rubber composition was then mixed with sulfur and vulcanization accelerator(s) in an internal rubber mixer to a temperature of about 70° C. for about 3 minutes.

The compositions of short fiber reinforced rubber are shown in the following Tables 1A through 1D.

TABLE 1A

|  | Sample A Control | Sample B | Sample C |
|---|---|---|---|
| First Non-Productive Mix Stage | | | |
| Natural rubber[1] | 70 | 70 | 70 |
| Cis 1,4-polyisoprene rubber[2] | 25 | 25 | 25 |
| Cis 1,4-polybutadiene rubber[3] | 5 | 5 | 5 |
| Cotton flock short fiber X[4] | 0 | 3 | 3 |
| Aramid short fiber Y[5] | 0 | 0 | 0 |
| Carbon black[6] | 45 | 45 | 45 |
| Anchoring agent[7] | 0 | 5 | 0 |
| Fatty acid[7] | 0.5 | 0.5 | 0.5 |
| Zinc oxide | 4 | 4 | 4 |
| Oil | 2 | 2 | 2 |
| Productive Mix Stage | | | |
| Sulfur | 2.8 | 2.8 | 2.8 |
| Accelerators[8] | 0.9 | 0.9 | 0.9 |
| Antidegradants[9] | 1.5 | 1.5 | 1.5 |

TABLE 1B

|  | Sample D "Control" |
|---|---|
| First, Non-Productive Mix Stage | |
| Natural rubber[1] | 70 |
| Cis 1,4-polyisoprene rubber[2] | 25 |
| Cis 1,4-polybutadiene rubber[3] | 5 |
| Cotton flock short fiber X[4] | 0 |
| Aramid short fiber Y[5] | 0 |
| Carbon black[6] | 45 |
| Anchoring agent[7] | 5 |
| Fatty acid[7] | 0.5 |
| Zinc oxide | 4 |
| Oil | 2 |
| Productive Mix Stage | |
| Sulfur | 2.8 |
| Accelerators[8] | 0.9 |
| Antidegradants[9] | 1.5 |

TABLE 1C

|  | Sample E Control | Sample F | Sample G |
|---|---|---|---|
| First Non-Productive Mix Stage | | | |
| Natural Rubber[1] | 70 | 70 | 70 |
| Cis 1,4-polyisoprene rubber[2] | 25 | 25 | 25 |
| Cis 1,4-polybutadiene rubber[3] | 5 | 5 | 5 |
| Cotton flock short fiber X[4] | 0 | 10 | 10 |
| Aramid short fiber Y[5] | 0 | 0 | 0 |
| Carbon black[6] | 45 | 45 | 45 |
| Anchoring agent[7] | 0 | 6 | 0 |
| Fatty acid[7] | 0.5 | 0.5 | 0.5 |
| Zinc oxide | 4 | 4 | 4 |
| Oil | 2 | 2 | 2 |
| Productive Mix Stage | | | |
| Sulfur | 2.8 | 2.8 | 2.8 |
| Accelerators[8] | 1.6 | 1.6 | 1.6 |
| Antidegradants[9] | 1.5 | 1.5 | 1.5 |

TABLE 1D

|  | Sample H | Sample I |
| --- | --- | --- |
| First Non-Productive Mix Stage |  |  |
| Natural Rubber[1] | 70 | 75 |
| Cis 1,4-polyisoprene rubber[2] | 25 | 25 |
| Cis 1,4-polybutadiene rubber[3] | 5 | 5 |
| Cotton flock short fiber X[4] | 0 | 0 |
| Aramid short fiber Y[5] | 3 | 3 |
| Carbon black[6] | 45 | 45 |
| Anchoring agent[7] | 4 | 0 |
| Fatty acid[7] | 0.5 | 0.5 |
| Zinc oxide | 4 | 4 |
| Oil | 2 | 2 |
| Productive Mix Stage |  |  |
| Sulfur | 2.8 | 2.8 |
| Accelerators[8] | 1.6 | 1.6 |
| Antidegradants[9] | 1.5 | 1.5 |

[1]Cis 1,4-polyisoprene natural rubber.
[2]Cis 1,4-polyisoprene synthetic rubber obtained as NATSYN® 2000 from The Goodyear Tire & Rubber Company.
[3]Cis 1,4-polybutadiene rubber obtained as BUDENE® 1207 from The Goodyear Tire & Rubber Company.
[4]Cotton flock short fibers as Akroflock DCV-2 from the Akrochem Company understood to have an average short fiber length of about 90 microns.
[5]A composite of aramid short fibers as Kevlar pulp blended with cis 1,4-polyisoprene natural rubber obtained from the E. I. Dupont de Nemours company which contained about 23 weight percent of said pulp, said fibers having a length to diameter ratio ranging from about 5/1 to 250/1.
[6]N660 carbon black, an ASTM designation.
[7]A composite of a 50/50 ratio of bis-(3-ethoxysilylpropyl) disulfide on a carbon black substrate as X266S, a trademark of Degussa AG.
[8]Primarily stearic acid.
[9]Of the sulfenamide type.
[10]Amine type antidegradants.

The Samples were vulcanized at a temperature of about 150° C. for about 18 minutes. Various of their physical properties are shown in the following Tables 2A through 2C.

TABLE 2A

| Properties | Sample A Control | Sample B | Sample C |
| --- | --- | --- | --- |
| Rheometer (150° C.) |  |  |  |
| T$_{25}$, minutes | 1.46 | 2.14 | 1.46 |
| T$_{90}$, minutes | 3.06 | 3.42 | 3.04 |
| Vulcanized Rubber Composition Properties |  |  |  |
| Stress-Strain |  |  |  |
| Tensile Strength, MPa | 10.1 | 10 | 9.4 |
| 100% Modulus, MPa | 0.9 | 2.1 | 0.9 |
| 300% Modulus, MPa | 4.6 | 8.8 | 4.7 |

TABLE 2B

| Properties | Sample D "Control" | Sample E "Control" |
| --- | --- | --- |
| Rheometer (150° C.) |  |  |
| T$_{25}$, minutes | 2 | 2.1 |
| T$_{90}$, minutes | 3.29 | 3.3 |
| Vulcanized Rubber Composition Properties |  |  |
| Stress-Strain |  |  |
| Tensile Strength, MPa | 9.4 | 22.4 |
| 100% Modulus, MPa | 0.9 | 1.9 |
| 300% Modulus, MPa | 4.5 | 11.5 |

TABLE 2C

| Properties | Sample F | Sample G | Sample H | Sample I |
| --- | --- | --- | --- | --- |
| T$_{25}$, minutes | 2.1 | 1.0 | 1.6 | 1.5 |
| T$_{90}$, minutes | 3.3 | 3.3 | 3.2 | 3.0 |
| Vulcanized Rubber Composition Properties |  |  |  |  |
| Stress-Strain |  |  |  |  |
| Tensile strength, MPa | 19.7 | 16.8 | 21.9 | 22.6 |
| 100% Modulus, MPa | 2.9 | 2.4 | 4.2 | 2.4 |
| 300% Modulus, MPa | 12.8 | 12.4 | 14.4 | 14.3 |

From Tables 2A through 2C it can be readily seen that the 100 percent modulus dramatically increased for the use of the cotton flock short fibers in both of Sample B (3 phr), F (10 phr) and G (10 phr), but not Sample C (3 phr) which did not contain an anchoring agent.

In particular, it is seen that the 100 percent modulus dramatically increased by over 130 percent for Sample B, where the cotton flock plus anchoring agent was used, as compared to both Control Sample A, where no cotton flock or anchoring agent was used, and also by over 130 percent as compared to Sample C where cotton flock was used but without the anchoring agent.

Therefore, it is concluded that use of the anchoring agent resulted in a significant effect when used in combination with the cotton flock short fibers in the rubber composition.

Further, it is seen that the 100 percent modulus also dramatically increased by over 50 percent for Sample F where the cotton flock (10 phr) plus anchoring agent was used as compared to Control Sample E, which used the same accelerator level of 1.6 phr, but where no cotton flock or anchoring agent was used, and also by over 20 percent as compared to Sample G (1.6 phr of accelerator) where the cotton flock (10 phr) was used but without the anchoring agent.

This is considered herein to be a confirmation that use of the anchoring agent resulted in a significant effect when used with the cotton flock short fibers in the rubber composition.

From Tables 2A through 2C, it can further be readily seen from "Control" Sample D that use of the anchoring agent in the rubber composition without the cotton flock had no effect on the 100 percent modulus as compared to Control Sample A.

This amplifies the significance of the effect of using the anchoring agent in combination with the cotton flock.

From Tables 2A through 2C, it can also be readily seen that the 100 percent modulus dramatically increased by over 120 percent for Sample H where both aramid short fibers and the anchoring agent were used as compared to Control Sample E where neither the anchoring agent nor aramid fiber pulp were used, and also by about 75 percent as compared to Sample I where the aramid pulp was used without the anchoring agent.

Similar dramatic effects are seen from Tables 2A through 2C for the 300 percent modulus for use of the anchoring agent in the rubber composition in combination with cotton flock, although no effect for use of the anchoring agent in combination with the aramid pulp.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition, containing from zero to 12 phr of amorphous silica and based upon 100 parts weight of elastomer, is comprised of (A) at least one diene-based elastomer selected from homopolymers and copolymers of conjugated diene and copolymers of at least one conjugated diene with a vinyl aromatic compound selected from styrene and alpha-methylstyrene, (B) about 0.5 to about 10 phr of short discrete organic fibers, (B) from about 35 to about 85 phr of reinforcing carbon black, and (C) an anchoring agent for said short fibers having a moiety reactive with at least one of hydroxyl groups and alkoxy groups and another moiety interactive with said elastomer(s).

2. The rubber composition of claim 1 wherein said rubber composition is exclusive of silica and said short fibers have an average length within a range of about 20 to about 800 microns and an aspect ratio in a range of about 25 to about 16,000.

3. The rubber composition of claim 1 wherein said short fibers are fibrillated fibers having a plurality of fibrils extending outwardly from the short fiber trunk, said fibrils having diameters substantially smaller than that of the diameter of the associated short fiber trunk from which they extend.

4. The rubber composition of claim 2 wherein said short fibers are fibrillated fibers having a plurality of fibrils extending outwardly from the short fiber trunk, said fibrils having diameters substantially smaller than that of the diameter of the associated short fiber trunk from which they extend.

5. The rubber composition of claim 1 wherein said organic fibers are selected from at least one of cotton, rayon, polyester, polyamide and polyaramid fibers.

6. The rubber composition of claim 2 wherein said organic fibers are selected from at least one of cotton, rayon, polyester, polyamide and polyaramid fibers.

7. The rubber composition of claim 4 wherein said organic fibers are selected from at least one of cotton, rayon, polyester, polyamide and polyaramid fibers.

8. The rubber composition of claim 1 wherein said organic fibers are selected from at least one of cotton and rayon fibers.

9. The rubber composition of claim 2 wherein said organic fibers are selected from at least one of cotton and rayon fibers.

10. The rubber composition of claim 4 wherein said organic fibers are selected from at least one of cotton and rayon fibers.

11. The rubber composition of claim 1 wherein said organic fibers are selected from at least one of polyester, polyamide and polyaramid fibers.

12. The rubber composition of claim 2 wherein said organic fibers are selected from at least one of polyester, polyamide and polyaramid fibers.

13. The rubber composition of claim 4 wherein said organic fibers are selected from at least one of polyester, polyamide and polyaramid fibers.

14. The rubber composition of claim 1 wherein said anchoring agent is comprised of the general formula (I):

$$(OR)_3\text{—Si—R'—S}_n\text{—R'—Si—}(OR)_3 \qquad (I)$$

wherein R is an alkyl group selected from at least one of methyl and ethyl groups, R' is an alkyl group selected from ethyl, propyl and butyl groups and n is a value of from 2 to 6 with an average of from 2 to 2.6 or from 3.5 to 4.

15. The rubber composition of claim 1 wherein said anchoring agent is a bis-(3-trialkoxysilyl) tetrasulfide with an average of from about 2 to 2.5 or 3.5 to 4 connecting sulfur atoms in its polysulfidic bridge.

16. The rubber composition of claim 15 wherein said anchoring agent is a bis-(3-triethoxysilyl) polysulfide.

17. The rubber composition of claim 2 wherein said anchoring agent is a bis-(3-trialkoxysilyl) tetrasulfide with an average of from about 2 to 2.5 or 3.5 to 4 connecting sulfur atoms in its polysulfidic bridge.

18. The rubber composition of claim 17 wherein said anchoring agent is a bis-(3-triethoxysilyl) polysulfide.

19. The rubber composition of claim 4 wherein said anchoring agent is a bis-(3-trialkoxysilyl) tetrasulfide with an average of from about 2 to 2.5 or 3.5 to 4 connecting sulfur atoms in its polysulfidic bridge.

20. The rubber composition of claim 19 wherein said anchoring agent is a bis-(3-triethoxysilyl) polysulfide.

21. The rubber composition of claim 4 wherein said anchoring agent is a bis-(3-trialkoxysilyl) tetrasulfide with an average of from about 2 to 2.5 or 3.5 to 4 connecting sulfur atoms in its polysulfidic bridge.

22. The rubber composition of claim 19 wherein said anchoring agent is a bis-(3-triethoxysilyl) polysulfide.

23. The rubber composition of claim 5 wherein said anchoring agent is a bis-(3-trialkoxysilyl) tetrasulfide with an average of from about 2 to 2.5 or 3.5 to 4 connecting sulfur atoms in its polysulfidic bridge.

24. The rubber composition of claim 21 wherein said anchoring agent is a bis-(3-triethoxysilyl) polysulfide.

25. The rubber composition of claim 7 wherein said anchoring agent is a bis-(3-trialkoxysilyl) tetrasulfide with an average of from about 2 to 2.5 or 3.5 to 4 connecting sulfur atoms in its polysulfidic bridge.

26. The rubber composition of claim 23 wherein said anchoring agent is a bis-(3-triethoxysilyl) polysulfide.

27. The rubber composition of claim 1 wherein said anchoring agent is comprised of the general formula (II):

$$(OR)_3\text{—Si—R'—X} \qquad (II)$$

wherein R is an alkyl group selected from at least one of methyl and ethyl groups, R' is an alkyl group selected from ethyl, propyl and butyl groups and X is a radical selected from at least one of mercapto, methacrylate and epoxide, vinyl, amino, thiocyanate, ureido, isocyanato radicals.

28. The rubber composition of claim 1 which contains from about 2 to about 12 phr of amorphous silica.

29. The rubber composition of claim 28 wherein said short fibers have an average length within about 20 to about 800 microns and an aspect ratio within a range of about 25 to about 16,000.

30. The rubber composition of claim 28 wherein said amorphous silica is selected from precipitated silica and precipitated aluminosilicate.

31. The rubber composition of claim 3 which contains from about 2 to about 12 phr of amorphous silica.

32. The rubber composition of claim 28 wherein said amorphous silica is selected from precipitated silica and precipitated aluminosilicate.

33. The rubber composition of claim 26 wherein said anchoring agent is a bis-(trialkylsilylalkyl) polysulfide having an average of from 2 to 2.6 or from 3.5 to 4 connecting sulfur atoms in its polysulfide bridge.

34. The rubber composition of claim 30 wherein said anchoring agent is bis-(triethoxysilylpropyl) tetrasulfide having an average of from 2 to 2.6 or from 3.5 to 4 connecting sulfur atoms in its polysulfide bridge.

35. The rubber composition of claim 1 which contains from about 0.5 to about 4 phr of said short fibers, wherein said short fibers are selected from at least one of cotton, rayon, polyester, polyamide and polyaramid fibers and, wherein said anchoring agent is a bis-(3-triethoxysilylpropyl) tetrasulfide having an average of from 2 to 2.6 or 3.5 to 4 connecting sulfur atoms in its polysulfidic bridge.

36. An article of manufacture having at least one component comprised of the rubber composition of claim 1.

37. An article of manufacture having at least one component comprised of the rubber composition of claim 2.

38. An article of manufacture having at least one component comprised of the rubber composition of claim 3.

39. An article of manufacture having at least one component comprised of the rubber composition of claim 4.

40. An article of manufacture having at least one component comprised of the rubber composition of claim 5.

41. An article of manufacture having at least one component comprised of the rubber composition of claim 9.

42. An article of manufacture having at least one component comprised of the rubber composition of claim 11.

43. An article of manufacture having at least one component comprised of the rubber composition of claim 14.

44. An article of manufacture having at least one component comprised of the rubber composition of claim 15.

45. An article of manufacture having at least one component comprised of the rubber composition of claim 16.

46. An industrial product selected from at least one of hose, conveyor belt and power transmission belt having at least one component comprised of the rubber composition of claim 1.

47. An industrial product selected from at least one of hose, conveyor belt and power transmission belt having at least one component comprised of the rubber composition of claim 2.

48. An industrial product selected from at least one of hose, conveyor belt and power transmission belt having at least one component comprised of the rubber composition of claim 3.

49. An industrial product selected from at least one of hose, conveyor belt and power transmission belt having at least one component comprised of the rubber composition of claim 4.

50. An industrial product selected from at least one of hose, conveyor belt and power transmission belt having at least one component comprised of the rubber composition of claim 5.

51. An industrial product selected from at least one of hose, conveyor belt and power transmission belt having at least one component comprised of the rubber composition of claim 9.

52. An industrial product selected from at least one of hose, conveyor belt and power transmission belt having at least one component comprised of the rubber composition of claim 11.

53. An industrial product selected from at least one of hose, conveyor belt and power transmission belt having at least one component comprised of the rubber composition of claim 14.

54. An industrial product selected from at least one of hose, conveyor belt and power transmission belt having at least one component comprised of the rubber composition of claim 15.

55. An industrial product selected from at least one of hose, conveyor belt and power transmission belt having at least one component comprised of the rubber composition of claim 16.

56. A tire having at least one component comprised of the rubber composition of claim 1.

57. A tire having at least one component comprised of the rubber composition of claim 2.

58. A tire having at least one component comprised of the rubber composition of claim 3.

59. A tire having at least one component comprised of the rubber composition of claim 4.

60. A tire having at least one component comprised of the rubber composition of claim 5.

61. A tire having at least one component comprised of the rubber composition of claim 9.

62. A tire having at least one component comprised of the rubber composition of claim 11.

63. A tire having at least one component comprised of the rubber composition of claim 14.

64. A tire having at least one component comprised of the rubber composition of claim 15.

65. A tire having at least one component comprised of the rubber composition of claim 16.

66. A tire having a tread comprised of the rubber composition of claim 1.

67. A tire having a tread comprised of the rubber composition of claim 2.

68. A tire having a tread comprised of the rubber composition of claim 3.

69. A tire having a tread comprised of the rubber composition of claim 4.

70. A tire having a tread comprised of the rubber composition of claim 5.

71. A tire having a tread comprised of the rubber composition of claim 14.

72. A tire having a component comprised of the rubber composition of claim 1 where said component is a tire apex or tire sidewall insert.

73. A tire having a component comprised of the rubber composition of claim 2 where said component is a tire apex or tire sidewall insert.

74. A tire having a component comprised of the rubber composition of claim 3 where said component is a tire apex or tire sidewall insert.

75. A tire having a component comprised of the rubber composition of claim 4 where said component is a tire apex or tire sidewall insert.

76. A tire having a component comprised of the rubber composition of claim 5 where said component is a tire apex or tire sidewall insert.

77. A tire having a component comprised of the rubber composition of claim 14 where said component is a tire apex or tire sidewall insert.

78. A tire having a component comprised of the rubber composition of claim 1 wherein said component is an apex positioned adjacent to a bead portion of a pneumatic tire.

79. A tire having a component comprised of the rubber composition of claim 2 wherein said component is an apex positioned adjacent to a bead portion of a pneumatic tire.

80. A tire having a component comprised of the rubber composition of claim 3 wherein said component is an apex positioned adjacent to a bead portion of a pneumatic tire.

81. A tire having a component comprised of the rubber composition of claim 4 wherein said component is an apex positioned adjacent to a bead portion of a pneumatic tire.

82. A tire having a component comprised of the rubber composition of claim 5 wherein said component is an apex positioned adjacent to a bead portion of a pneumatic tire.

83. A tire having a component comprised of the rubber composition of claim 14 wherein said component is an apex positioned adjacent to a bead portion of a pneumatic tire.

84. A tire having a component comprised of the rubber composition of claim 1 wherein said component is a tire sidewall insert positioned within a sidewall portion of the tire and spaced apart from a bead portion the tire.

85. A tire having a component comprised of the rubber composition of claim 2 wherein said component is a tire sidewall insert positioned within a sidewall portion of the tire and spaced apart from a bead portion the tire.

86. A tire having a component comprised of the rubber composition of claim 3 wherein said component is a tire sidewall insert positioned within a sidewall portion of the tire and spaced apart from a bead portion the tire.

87. A tire having a component comprised of the rubber composition of claim 4 wherein said component is a tire sidewall insert positioned within a sidewall portion of the tire and spaced apart from a bead portion the tire.

88. A tire having a component comprised of the rubber composition of claim 5 wherein said component is a tire sidewall insert positioned within a sidewall portion of the tire and spaced apart from a bead portion the tire.

89. A tire having a component comprised of the rubber composition of claim 14 wherein said component is a tire sidewall insert positioned within a sidewall portion of the tire and spaced apart from a bead portion the tire.

90. A tire comprised of an assembly of at least one component as a partially pre-vulcanized rubber composition of claim 1 juxtapositioned to at least one additional, unvulcanized, diene-based, rubber composition; wherein said assembly is sulfur vulcanized in a suitable mold at a temperature in a range of about 140° C. to about 190° C.

91. A tire comprised of an assembly of at least one component as a partially pre-vulcanized rubber composition of claim 2 juxtapositioned to at least one additional, unvulcanized, diene-based, rubber composition; wherein said assembly is sulfur vulcanized in a suitable mold at a temperature in a range of about 140° C. to about 190° C.

92. A tire comprised of an assembly of at least one component as a partially pre-vulcanized rubber composition of claim 3 juxtapositioned to at least one additional, unvulcanized, diene-based, rubber composition; wherein said assembly is sulfur vulcanized in a suitable mold at a temperature in a range of about 140° C. to about 190° C.

93. A tire comprised of an assembly of at least one component as a partially pre-vulcanized rubber composition of claim 14 juxtapositioned to at least one additional, unvulcanized, diene-based, rubber composition; wherein said assembly is sulfur vulcanized in a suitable mold at a temperature in a range of about 140° C. to about 190° C.

94. The rubber composition of claim 1 wherein said diene-based elastomer is selected from at least one of homopolymers and copolymers of conjugated dienes selected from at least one of isoprene and 1,3-butadiene and from at least one of copolymers of at least one conjugated diene selected from isoprene and 1,3-butadiene with styrene.

95. The rubber composition of claim 1 wherein said diene-based elastomer is selected from at least one of cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

96. The rubber composition of claim 1 where at least one of said diene-based elastomers is a tin coupled, organic solvent solution polymerization prepared, elastomer selected from cis 1,4-polyisoprene, cis 1,4-polybutadiene and styrene/butadiene copolymer.

97. The rubber composition of claim 94 where at least one of said diene-based elastomers is a tin coupled, organic solvent solution polymerization prepared, elastomer selected from cis 1,4-polyisoprene, cis 1,4-polybutadiene and styrene/butadiene copolymer.

98. An article of manufacture having at least one component comprised of the rubber composition of claim 94.

99. An article of manufacture having at least one component comprised of the rubber composition of claim 95.

100. An article of manufacture having at least one component comprised of the rubber composition of claim 96.

101. An article of manufacture having at least one component comprised of the rubber composition of claim 97.

\* \* \* \* \*